(12) United States Patent
Burek et al.

(10) Patent No.: US 8,818,157 B2
(45) Date of Patent: Aug. 26, 2014

(54) OPTICAL FIBER OR CABLE STORAGE MODULE FOR INSTALLATION AT CUSTOMER PREMISES

(75) Inventors: Denis E. Burek, Cumming, GA (US); Daniel Hendrickson, Roswell, GA (US); Paul Dickinson, Johns Creek, GA (US); John George, Cumming, GA (US); Williard C. White, Suwannee, GA (US); Jimmy Joy, Lawrenceville, GA (US)

(73) Assignee: OFS Fitel, LLC, Norcross, GA (US)

( * ) Notice: Subject to any disclaimer, the term of this patent is extended or adjusted under 35 U.S.C. 154(b) by 69 days.

(21) Appl. No.: 13/564,941

(22) Filed: Aug. 2, 2012

(65) Prior Publication Data
US 2012/0294580 A1 Nov. 22, 2012

Related U.S. Application Data

(62) Division of application No. 13/389,452, filed as application No. PCT/US2011/044419 on Jul. 19, 2011.

(60) Provisional application No. 61/365,963, filed on Jul. 20, 2010, provisional application No. 61/365,970, filed on Jul. 20, 2010, provisional application No. 61/371,828, filed on Aug. 9, 2010, provisional application No. 61/483,931, filed on May 9, 2011.

(51) Int. Cl.
*G02B 6/00* (2006.01)

(52) U.S. Cl.
USPC .................................................. 385/135

(58) Field of Classification Search
USPC .................................................. 385/134–137
See application file for complete search history.

(56) References Cited

U.S. PATENT DOCUMENTS

| 5,703,990 | A | 12/1997 | Robertson et al. | |
|---|---|---|---|---|
| 6,243,526 | B1 * | 6/2001 | Garibay et al. | 385/135 |
| 7,059,895 | B2 * | 6/2006 | Murano | 439/501 |

(Continued)

FOREIGN PATENT DOCUMENTS

| DE | 4309350 A1 | 9/1994 |
|---|---|---|
| GB | 2373493 A | 9/2002 |

OTHER PUBLICATIONS

European Patent Office, Search Report, EP Application No. 12195957.1-1226 (Jan. 23, 2013).

(Continued)

*Primary Examiner* — Daniel Petkovsek
(74) *Attorney, Agent, or Firm* — Law Office of Leo Zucker

(57) ABSTRACT

An optical fiber or cable storage module includes a back wall and a number of resilient mounting fingers extending from the back wall, and a fiber supply spool having an axial bore formed to receive the mounting fingers and to engage the fingers when the spool is urged toward the back wall so that the spool is restrained from axial movement. The spool includes a hub, and a first winding section for containing a length of fiber sufficient to route between a service terminal outside a user premises and a location near a user terminal inside the premises. The mounting fingers have corresponding catches at the ends of the fingers, and the inner circumference of the bore in the supply spool has an annular groove formed to seat the catches for restraining the spool from axial movement.

8 Claims, 12 Drawing Sheets

(56) References Cited

U.S. PATENT DOCUMENTS

| | | |
|---|---|---|
| 7,266,283 B2 | 9/2007 | Kline et al. |
| 7,346,253 B2 * | 3/2008 | Bloodworth et al. .......... 385/135 |
| 7,756,379 B2 * | 7/2010 | Kowalczyk et al. .......... 385/135 |
| 7,869,682 B2 * | 1/2011 | Kowalczyk et al. .......... 385/135 |
| 2004/0013391 A1 | 1/2004 | Joseph, II |
| 2005/0145522 A1 | 7/2005 | Bloodworth et al. |
| 2008/0187276 A1 | 8/2008 | Roberts et al. |
| 2009/0074370 A1 | 3/2009 | Kowalczyk et al. |
| 2010/0054680 A1 | 3/2010 | Lochkovic et al. |
| 2012/0020635 A1 | 1/2012 | Hendrickson et al. |

OTHER PUBLICATIONS

Furukawa Electric Co., Ltd., Optical Connector Rosette for FTTX Network, Product No. J424 (2 pages, undated).

Furukawa Electric Co., Ltd., Premises Connector Rosette for FTTX Network, Product Nos. J418 SC & J418 SCx2 (2 pages, undated).

AM Networks, Fiber Distribution Terminal for MDU Applications, Product Family DW—FDT Wallmount (2 pages, undated).

* cited by examiner

OPTICAL FIBER OR CABLE STORAGE MODULE FOR INSTALLATION AT CUSTOMER PREMISES

CROSS REFERENCE TO RELATED APPLICATIONS

This application is a divisional of co-pending U.S. patent application Ser. No. 13/389,452 filed Feb. 8, 2012, under 35 U.S.C. Sec. 371 from International Application PCT/US2011/044419 filed Jul. 19, 2011, and titled Optical Fiber Installation at Customer Premises. The '419 IA claims priority under 35 U.S.C. Sec. 119(e) of U.S. Provisional Pat. Application 61/365,963 filed Jul. 20, 2010, for Home Fiber Routing System; 61/365,970 filed Jul. 20, 2010, for Home Fiber Routing System; 61/371,828 filed Aug. 9, 2010, for Home Fiber Routing System; and 61/483,931 filed May 9, 2011, for EZ-Bend ILU Micro-Drop Solution. All of the foregoing applications are incorporated by reference in their entireties.

BACKGROUND OF THE INVENTION

1. Field of the Invention

The present invention relates to an optical fiber or cable storage module for installation at the premises of a fiber network user or subscriber.

2. Discussion of the Known Art

U.S. Pat. No. 7,266,283 (Sep. 4, 2007) describes fiber optic storing and dispensing apparatus, including a casing containing a rotatable spool on which relatively long and short lengths of a fiber optic jumper cable are coiled in corresponding grooves. Both ends of the cable are coupled to connectors. One length of the cable is extendable a certain distance from the casing to establish a first connection at one end of the jumper cable. A short length is then uncoiled manually from the spool in order to make a second connection at the opposite end of the cable. The patent notes (col. 5, lines 32-39) that once the jumper cable is connected at both ends, the casing may be mounted on a metal junction box via magnetic strips in order to provide a stable removable support for the casing.

U.S. Pat. Appl'n Pub. 2009/0074370 (Mar. 19, 2009) also discloses a fiber optic enclosure, including a cable spool that engages a bearing mount inside the enclosure housing. Moreover, U.S. Pat. Appl'n Pub. 2008/0187276 (Aug. 7, 2008) discloses a flexible optical fiber tape including an adhesive substrate strip, and at least one optical fiber maintained by the substrate. The strip can be adhered along with the fiber to a wall, floor or ceiling in indoor applications, according to the patent.

There is an increasing use of so-called desktop optical network terminals (ONTs) that can be installed inside a given user's residence or office, and located in close proximity to the user's TV set top box and/or network modem. A need therefore exists for a method of routing an optical fiber or cable between a desktop ONT installed inside a customer's residence and an existing network terminal or box that is typically located outside the residence, so as to allow the installation to be performed quickly and with least visibility.

While the use of conventional cable staples to route an optical fiber or cable along an existing wall, molding, or other exposed surface may reduce installation time and incur relatively low cost, stapled installations have been rejected by many customers who opt instead for special molding or conduit solutions. Staples can also physically damage walls and moldings, or impair or break an optical fiber if the staples are not carefully impacted or otherwise set in place over the length of the fiber. Moreover, many customers prefer to have all service cables totally concealed inside their premises, which requires expensive hardware and significant installation time.

Accordingly, a system that enables an installer to route and permanently bond a cable quickly, easily, and safely over exposed surfaces, grooves and/or corners inside a user's premises with least visibility, is very desirable.

SUMMARY OF THE INVENTION

According to the invention, an optical fiber or cable storage module includes a back wall, and a number of resilient mounting fingers extending from the back wall inside the module. A fiber supply spool has an axial bore with an inner circumference dimensioned and formed to (a) receive the free ends of the mounting fingers when the spool is centered over the fingers, and (b) engage the mounting fingers when the spool is urged toward the back wall so that the spool is restrained from axial movement. The spool includes a hub, and a first winding section for containing a length of fiber sufficient to route between a service terminal located outside a user premises, and a location in the vicinity of a user terminal placed inside the premises.

A fiber optic connector adapter is supported in the vicinity of the supply spool when the spool is engaged by the mounting fingers, and a proximal end of the adapter is configured to connect with a mating connector on the fiber contained on the spool. The mounting fingers have corresponding catches formed at the ends of the fingers, and the inner circumference of the axial bore in the spool has an annular groove formed to seat the catches for restraining the spool from axial movement.

For a better understanding of the invention, reference is made to the following description taken in conjunction with the accompanying drawing and the appended claims.

DETAILED DESCRIPTION OF THE INVENTION

As used herein, the words "user" and "customer" are used inter-changeably to refer to one or more persons or legal entities that use telecommunication services offered by a service provider to acquire, e.g., Internet access, telephony, television, and other information or data streams, wherein the services require the installation of one or more lengths of an optical fiber or cable at the location where the services are used by the person or entity (e.g., a home residence, apartment, or office building). Further, the words "residence" and "premises" are used interchangeably herein to connote the residence, office, or other structural living unit where the services are used by the person or entity.

The system disclosed herein allows an optical fiber or cable to be installed quickly and safely at a customer's residence, leaving few if any visible signs of the installation when completed. Commonly owned co-pending U.S. patent application Ser. No. 12/986,990 filed Jan. 7, 2011 (published as US 2012/0020635 on Jan. 26, 2012, and incorporated by reference), discloses a tool for routing an optical fiber or cable over a desired span inside a living unit of a residential customer. In one embodiment, the tool includes a rod having a handle at a proximal end, and a spool mounted on the rod for containing a length of the fiber to be routed. An adhesive applicator assembly is fixed on the rod, and the assembly operates to apply an adhesive on the fiber when the fiber is unwound from the spool while the tool is being used. A fiber applicator tip is mounted at the distal end of the rod, and the applicator tip places the fiber with the applied adhesive on a surface inside the living unit, and urges the fiber to adhere to the surface when an installer manipulates the rod handle accordingly.

Figure 1:
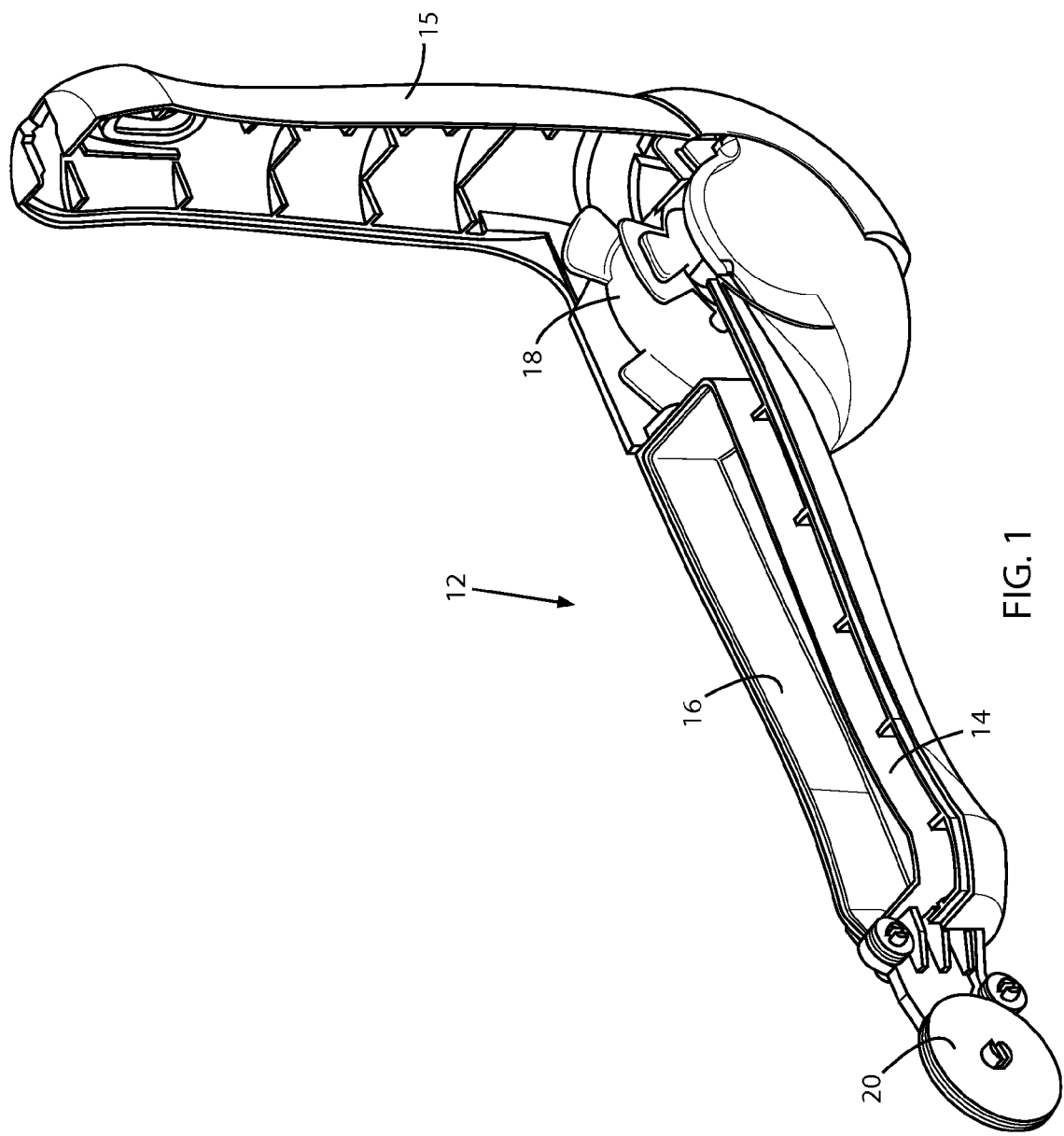
FIG. 1 is an isometric view of an optical fiber cable installation tool including a tool body or chassis, and a cover for the tool body in an open position, according to the invention.

According to the present invention, an installer can route and bond an optical fiber or other service cable easily and safely over walls, ceilings, moldings, grooves, corners and other exposed surfaces at a customer's premises, using a hand tool 12 which is shown in FIG. 1 and described in detail below. Basically, the fiber is initially coated with a dry, activatable adhesive substance on its outer circumference, and the coating becomes activated as the tool 12 routes the fiber over the exposed surface. The coating is formulated so that when activated, it acquires properties sufficient to adhere the fiber or cable to the surface. When the adhesive cures or hardens, it bonds the fiber to the surface and physically protects the fiber as well. Additional mechanical protection for the fiber can be achieved by routing the fiber within existing structural corners or grooves, while keeping the fiber hidden from view.

A buffered optical fiber suitable for coating and use according to the invention, is available from OFS Fitel LLC, Norcross, Ga. US 30071, under the registered trademark EZ Bend®. The OFS EZ-Bend fiber is compliant with Telcordia GR-326 and GR-409, IEC 60794, and other standards, and the fiber can accommodate a bend radius as small as 3 mm without significant signal loss. The fiber is also compatible and qualified to be terminated with Fitel or Sumitomo fusion splice connectors, and with 3M or Senko mechanical connectors. Moreover, the EZ-Bend fiber can be routed to conform with up to 25 structural corners at a given residence when using inside and outside corner bend managers 90, 92 such as shown and described in connection with FIGS. 10 and 11.

The inventive system also eliminates any need for an installer to cut, splice or terminate the fiber with connectors while in the field, by providing a connection module 70 (see FIG. 9 and related text below) that safely manages and stores slack fiber, i.e., fiber left unwound from a supply spool after the fiber has been routed fully over a desired path at the user premises.

Figure 2:
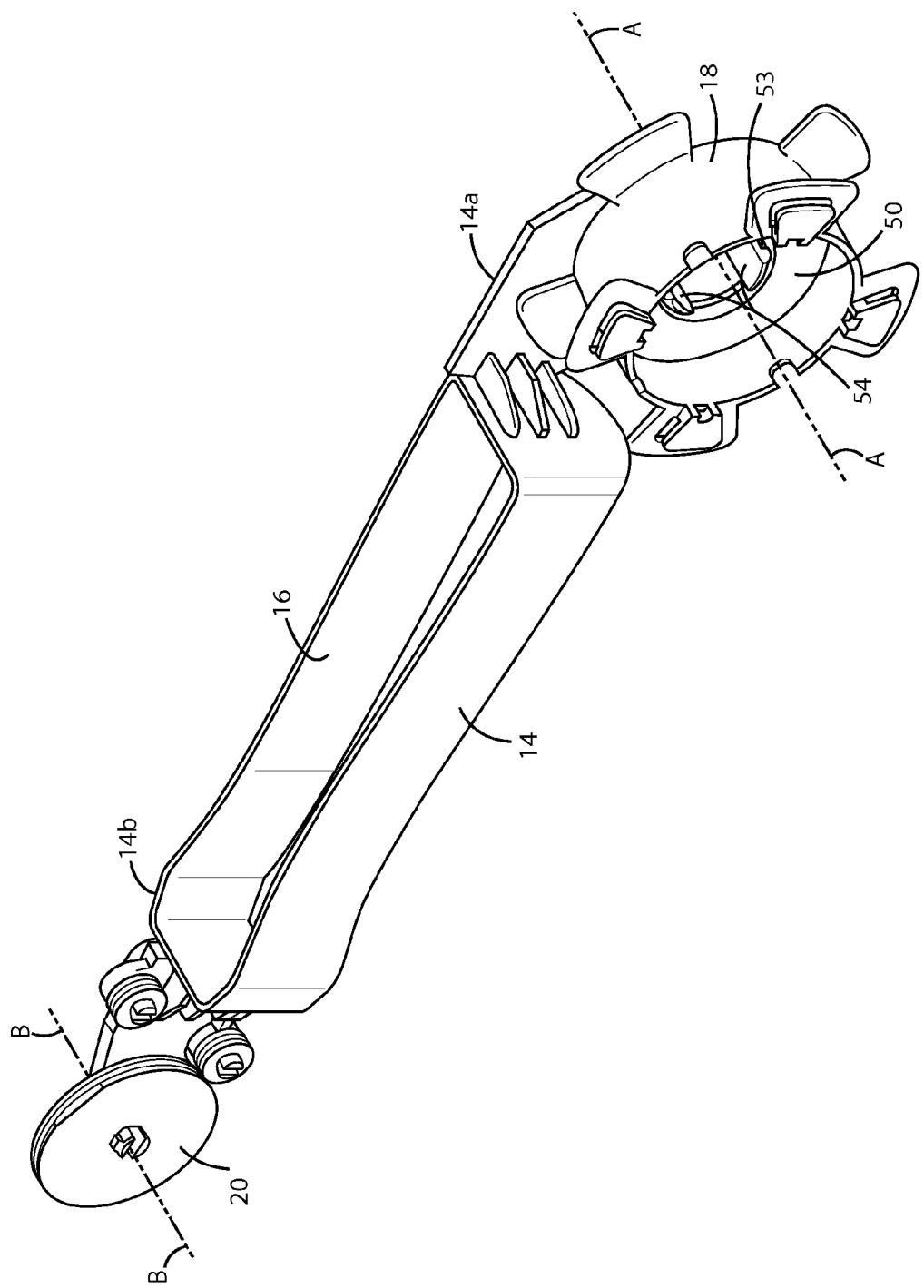
FIG. 2 is an isometric view of the tool body showing an adhesive activation chamber, and a cable supply spool and an applicator wheel mounted at opposite ends of the activation chamber, according to the invention.

FIG. 1 shows an optical fiber or cable installation tool 12 including an elongated tool chassis or frame 14, and a tool cover 15 in an open position, according to the invention. FIG. 2 is a view of the tool chassis 14, including an adhesive coating activation chamber 16 which, in the illustrated embodiment, is configured to be located between a first end 14a of the chassis and a second end 14b of the chassis opposite the first end 14a. A fiber supply spool 18 having a spool axis A is configured to be mountable on and removable from the first end 14a of the tool chassis 14. When mounted on the tool chassis, the spool 18 is free to rotate about its axis A. A cable applicator roller or wheel 20 is mounted for rotation about its wheel axis B at a second end 14b of the tool chassis 14, opposite the first end 14a of the chassis.

Figure 3:
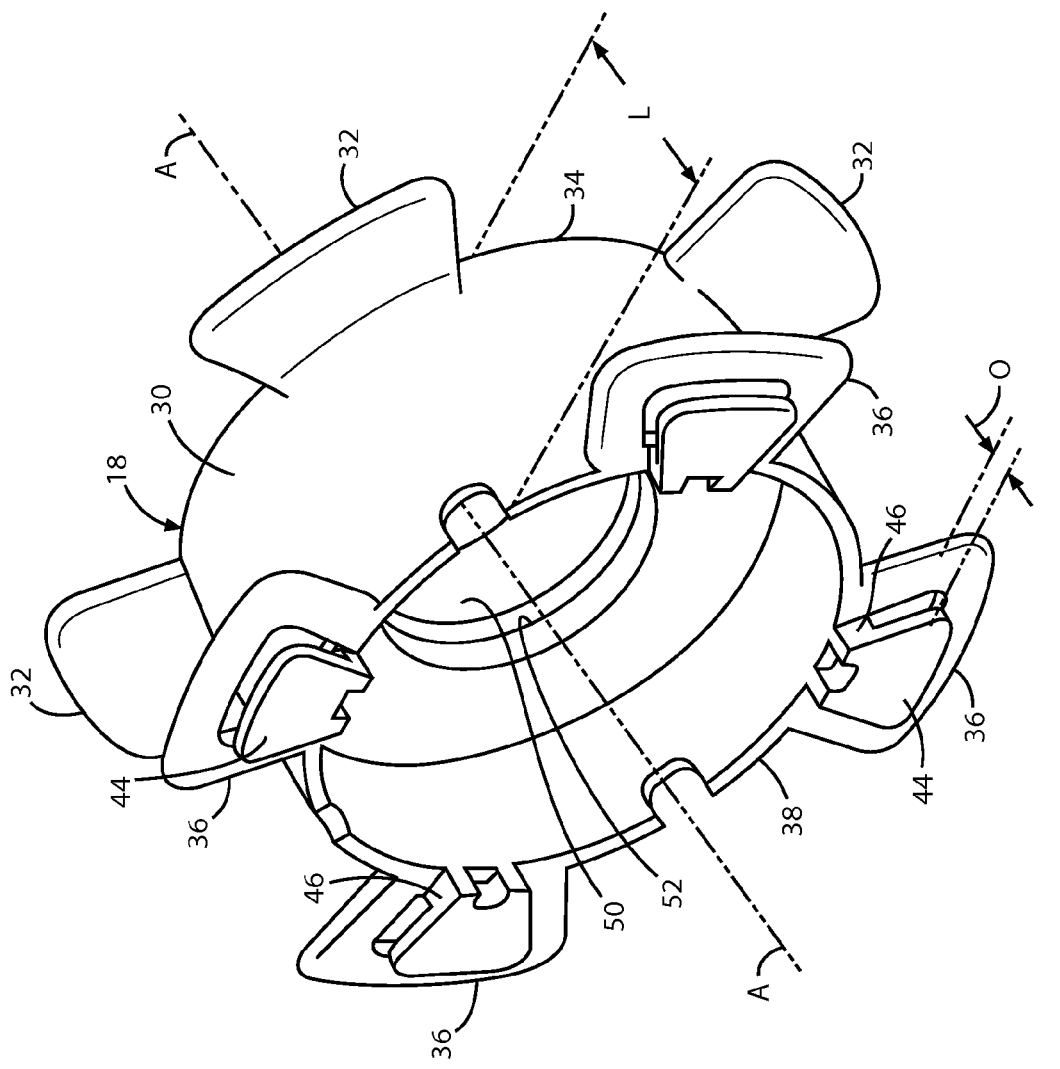
FIG. 3 is an enlarged isometric view showing details of the cable supply spool in FIG. 2, including a first section for containing windings of a first length of a continuous fiber optic cable and a second section for containing windings of a second length of the cable, according to the invention.

FIG. 3 is an enlarged view showing the fiber supply spool 18 in an empty state. The spool 18 has a cylindrical wall or hub 30 having an axial length L of, e.g., approximately 0.870 inches. A first set of, e.g., four equi-circumferentially spaced retaining flanges 32 (three of which are visible in FIG. 3) extend radially outward from the spool hub 30 at a first axial end face 34 of the hub, as seen at the right in FIG. 3. A second set of equi-circumferentially spaced flanges 36 extend radially outward from the hub 30 at a second axial end face 38 of the hub, opposite the first set of flanges 32 at the first end face 34 of the hub. The first and the second sets of retaining flanges 32, 36 and the spool hub 30, together define a first winding section of the supply spool 18.

Figure 4:
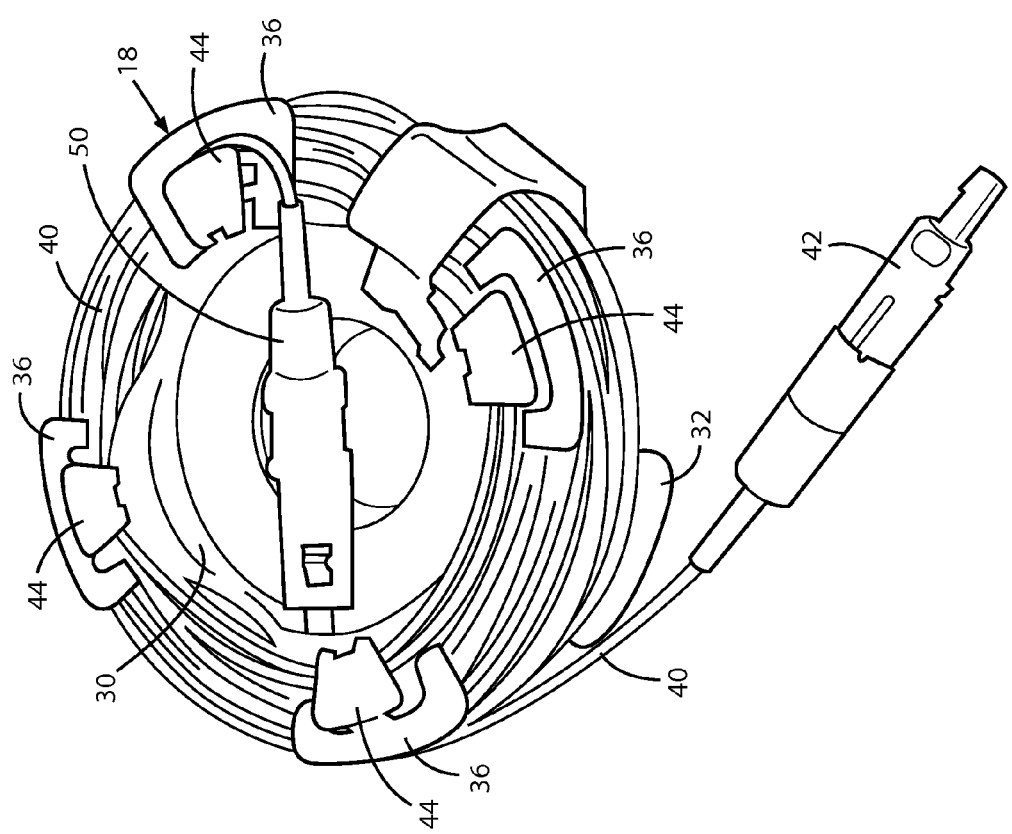
FIG. 4 is a perspective view of the cable supply spool, and a cable wound continuously through both sections of the spool with connectors terminating both ends of the cable.
Figure 5:
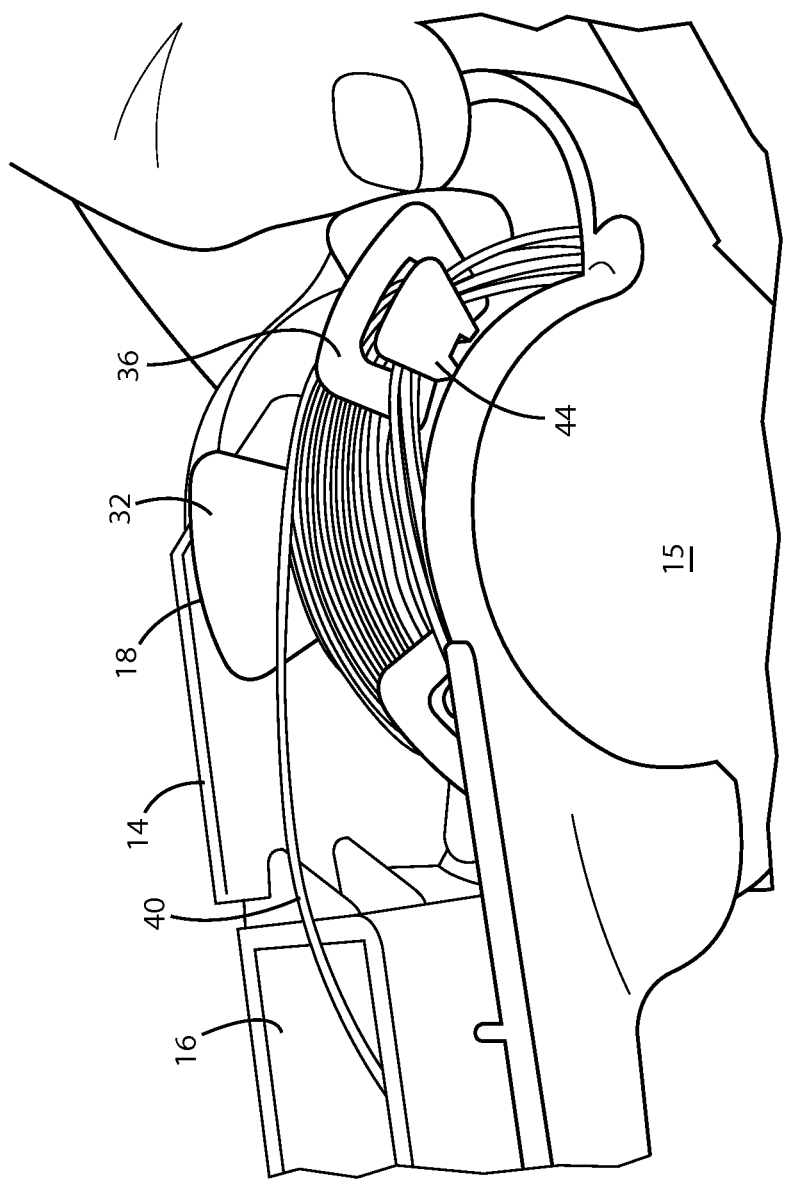
FIG. 5 is a perspective view of a visible portion of the supply spool and cable in FIG. 4 when the spool is mounted on the tool body as in FIG. 1, and cable from the first section of the spool is directed through the activation chamber.

As seen in FIGS. 4 and 5, a number of turns of a fiber 40 such as, e.g., the mentioned EZ Bend fiber are wound in the first winding section of the supply spool 18 over the spool hub 30 and between the opposed sets of retaining flanges 32, 36, after the fiber 40 is coated according to the invention. The end of the fiber 40 wound in the first winding section of the spool 18 is preferably provided with a fiber optic connector 42 for terminating the end of the fiber; for example, a type SC-APC or a type SC-UPC connector as shown in FIG. 4.

The hub 30 of the spool 18 has a reduced or narrowed inside diameter portion 51, shown in FIGS. 2 and 3, that extends in the axial direction from the first end face 34 of the spool 18 for about one-half the overall axial length L of the spool. An annular groove 52 is formed in the inner circumference of the reduced diameter portion 51 as shown in FIG. 3, for engaging and seating catches 53 formed near the ends of three finger-like, equi-circumferentially spaced resilient mounting fingers 54 that extend perpendicularly from the first end 14a of the tool chassis 14 (see FIG. 2). When the first end face 34 of the spool 18 is centered over the mounting fingers 54 and urged toward the tool chassis 14, the fingers 54 are arranged and configured to enter the reduced diameter portion 51 of the spool hub 30, and to deflect radially inward toward one another until the catches 53 at the ends of the fingers become seated in the annular groove 52 so as to define a mounted position for the spool 18.

When mounted at the first end 14a of the tool chassis 14, the spool 18 is restrained from axial movement by the catches 53 which are being urged by the respective mounting fingers 54 to remain seated in the groove 52. The spool 18 is free, however, to rotate about its axis A as long as the catches 53 at the ends of the mounting fingers 54 stay seated in the groove 52 and do not otherwise contact the inner circumference of the spool.

A third set of retaining flanges 44 are formed next to the second end face 38 of the spool hub 30 at four equi-circumferentially spaced positions that coincide with the positions of the second set of flanges 36, as seen in FIGS. 3, 4 and 5. Each flange 44 of the third set is joined to the hub end face 38 by a base lip 46, so that the flange 44 is offset axially by a spacing O from an opposed flange 36 of the second set, and the flange 44 extends radially outward from the hub 30 and parallel to the opposed flange 36. The second and the third sets of retaining flanges 36, 44 and the base lips 46 of the flanges 44, together define a second winding section of the supply spool 18.

As seen in FIGS. 4 and 5, the fiber 40 is also wound to have a certain number of turns in the second winding section of the spool 18, between the second and the third sets of retaining flanges 36, 44 on the spool. The free end of the fiber 40 wound in the second winding section is also preferably terminated by a fiber optic connector 50, e.g., a type SC-APC or SC-UPC connector as shown in FIG. 4. The supply spool 18 may therefore be pre-wound with a buffered optical fiber such as the mentioned EZ-Bend fiber terminated with connectors at both ends of the fiber, and coated with an activatable, dry adhesive substance according to the invention as explained below.

The adhesive coating may be similar in composition to a dry glue typically used on flaps of large envelopes, and on brown paper tape used for sealing boxes and cartons. The composition is preferably extruded while wet onto the buffered fiber 40, and then dried with heated air. The activating substance provided in the activation chamber 16 may be similar to common wall paper paste in composition. The chamber 16 should be configured to hold more than a sufficient quantity of the activating substance for one complete spool of coated fiber 40, so that the substance level in the chamber need not be monitored over the course of a given installation. Once the installation is finished, the chamber 16 with any remaining substance may be removed from the tool chassis 14, and discarded or recycled.

The coating is preferably formulated so that when activated, the fiber 40 can be bonded to a variety of different painted surfaces including wood, drywall, plaster, brick, concrete or concrete block, thus maximizing the number of instances where the system provides an effective fiber routing solution. It has been found that the inventive system offers superior fiber adhesion relative to tape based solutions, because (a) when in a semi-liquid state, the adhesive coating on the fiber is free to flow into and conform with various degrees of roughness and irregularities on the adjacent surface, and (b) the fiber can be easily removed from and re-positioned on the surface for several minutes following initial adhesion without damaging the fiber, and with no impact on the strength of the final adhesive bond between the fiber and the surface. The activated adhesive is preferably water based, so it is safe for contact with human skin whether in dry or semi-liquid form, and it can be washed off easily with soap and water. Once hardened, the adhesive may also be painted using conventional oil, latex or water based paints.

Figure 7:
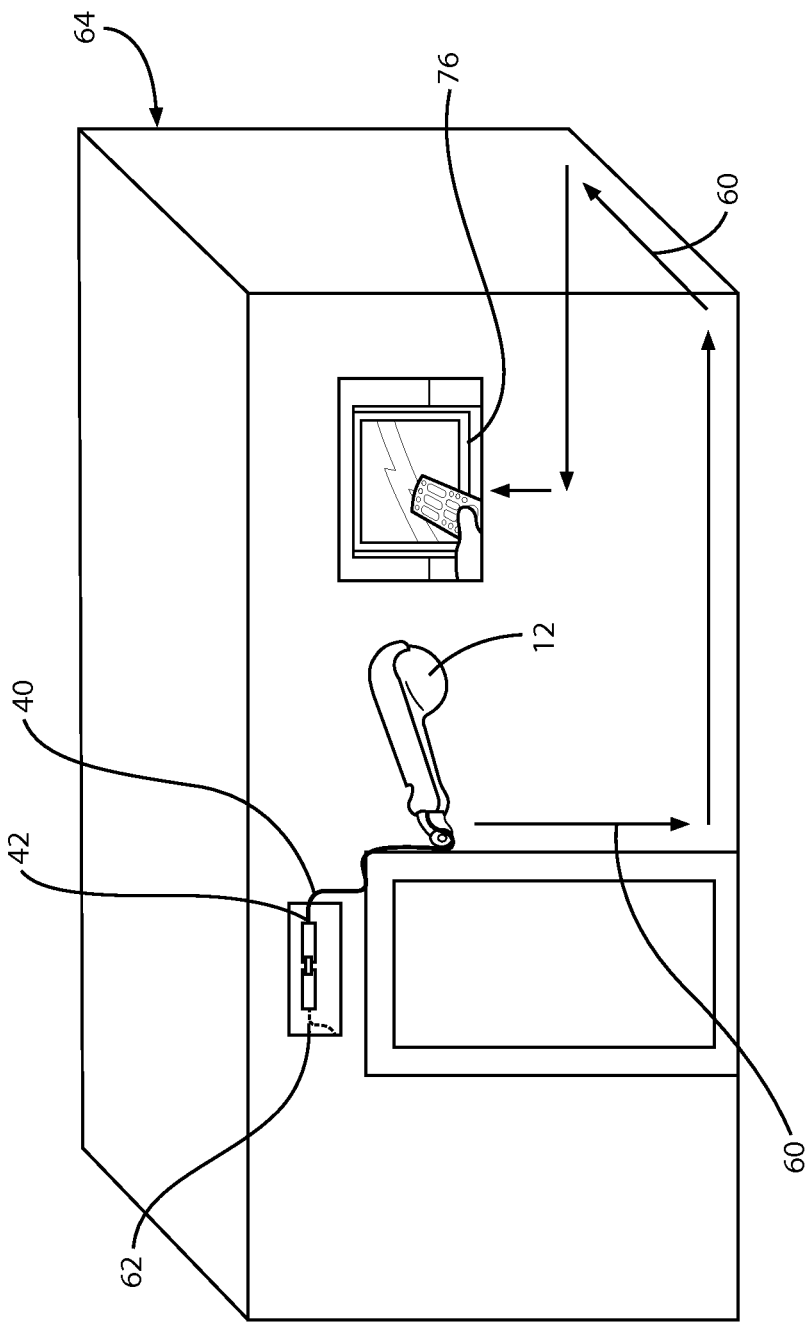
FIG. 7 is a diagram illustrating routing the cable from an outside network entry box to a desired location inside a customer residence, according to the invention.
Figure 8:
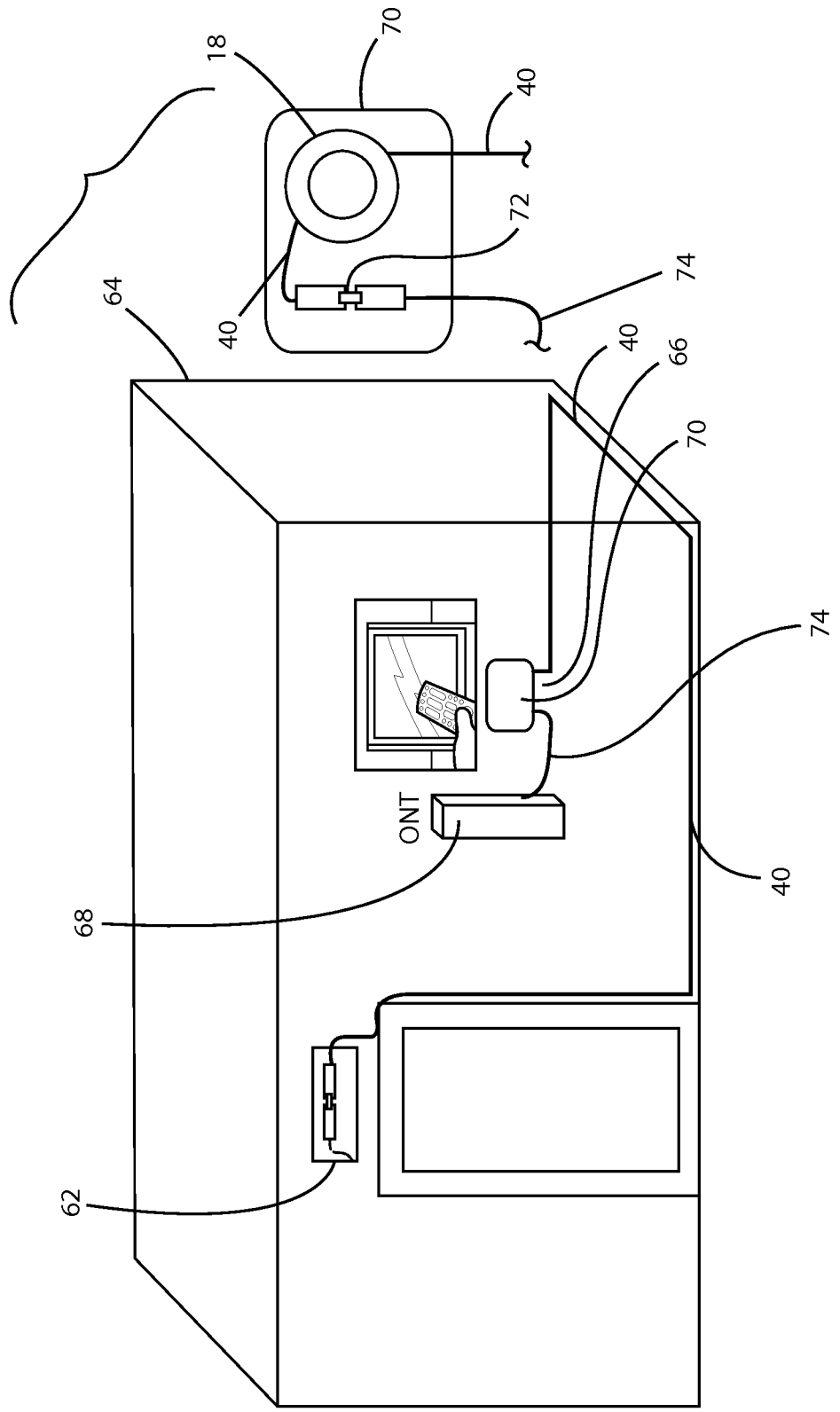
FIG. 8 is a diagram illustrating terminating the cable at an optical network terminal (ONT) inside the residence, including use of a slack cable storage module according to the invention.
Figure 9:
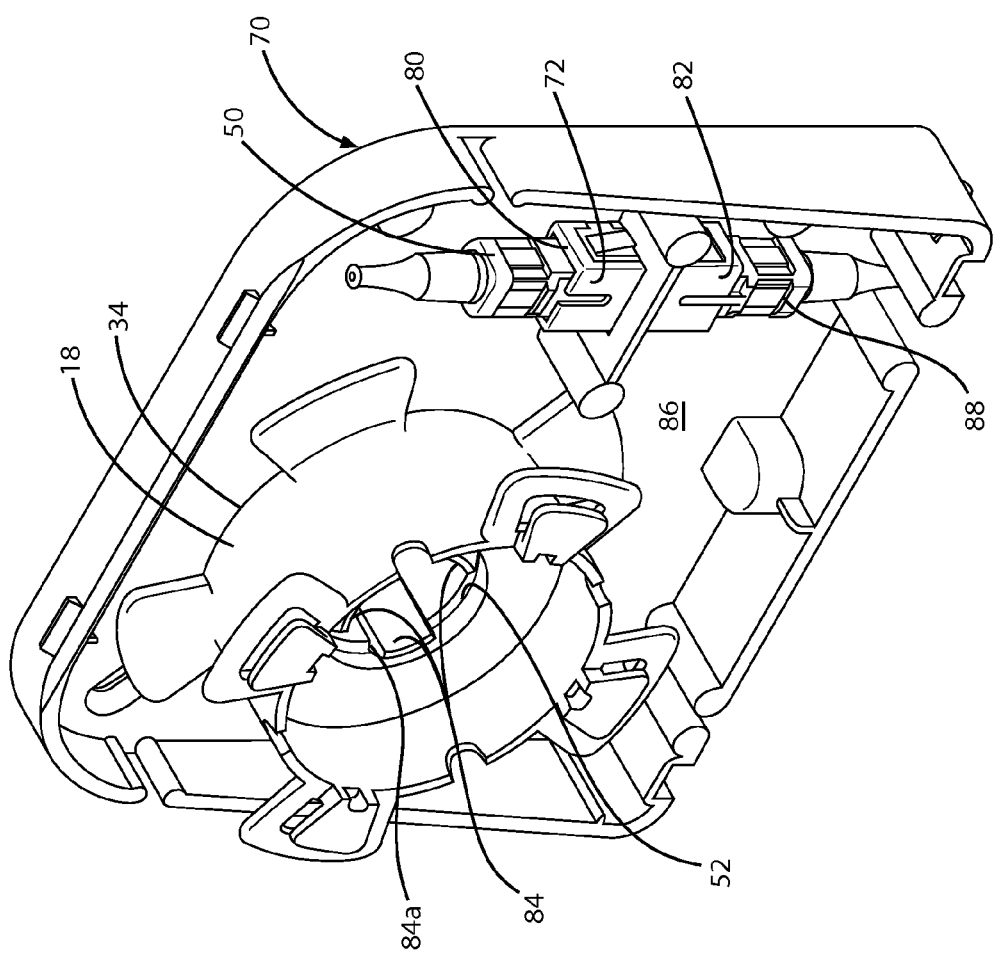
FIG. 9 is an enlarged, isometric view showing details of the cable storage module in FIG. 8.

The length of the fiber 40 wound in the first winding section of the spool 18 should be ample for routing over a path 60 from, e.g., a service entrance terminal or box 62 mounted outside premises 64 as illustrated in FIG. 7, to a location 66 in the vicinity of an ONT 68 placed inside the premises 64 as shown in FIG. 8. An interior living unit (ILU) module 70, shown in detail in FIG. 9, is mounted inside the premises 64 (e.g., on an exposed wall) at the location 66 and the supply spool 18 with any windings of the fiber 40 remaining in the first winding section is mounted inside the ILU module 70. The length of the fiber 40 wound in the second winding section of the spool 18 need only be enough to allow the connector 50 at end of the fiber to connect to a connector adapter 72 mounted inside the ILU module 70, as seen in FIG. 9.

For example, a typical installation may be accommodated by selecting a spool 18 that is initially wound with a length of the coated fiber 40 of between 25 and 150 feet, in 25 foot increments, and with both connectors 42, 50 at the ends of the fiber. A separate jumper cable 74 may then connect the adapter 72 in the module 70 to the ONT 68 inside the premises 64, as shown in FIG. 8.

A typical fiber routing installation at a customer premises may therefore be performed according to the following steps.

1. Define the routing path 60 (FIG. 7) between the existing entry box 62 outside the premises 64, and the intended location 66 near the new ONT 68 inside the premises 64, e.g., near a television set-top box and/or an Internet router. Press corner bend managers 90, 92 (see FIGS. 10 and 11) in place on all inside and outside structural corners along the defined path 60. Unused wires or other cables previously routed between the entry terminal 62 and the interior of the premises 64 may be removed if desired.

2. Uncoil a short length of the fiber 40 from the first winding section of the spool 18 with the connector 42 at the end of the fiber, and plug the connector 42 into a corresponding mating connector or adapter provided in the outside entry box 62. See FIG. 7.

Figure 6:
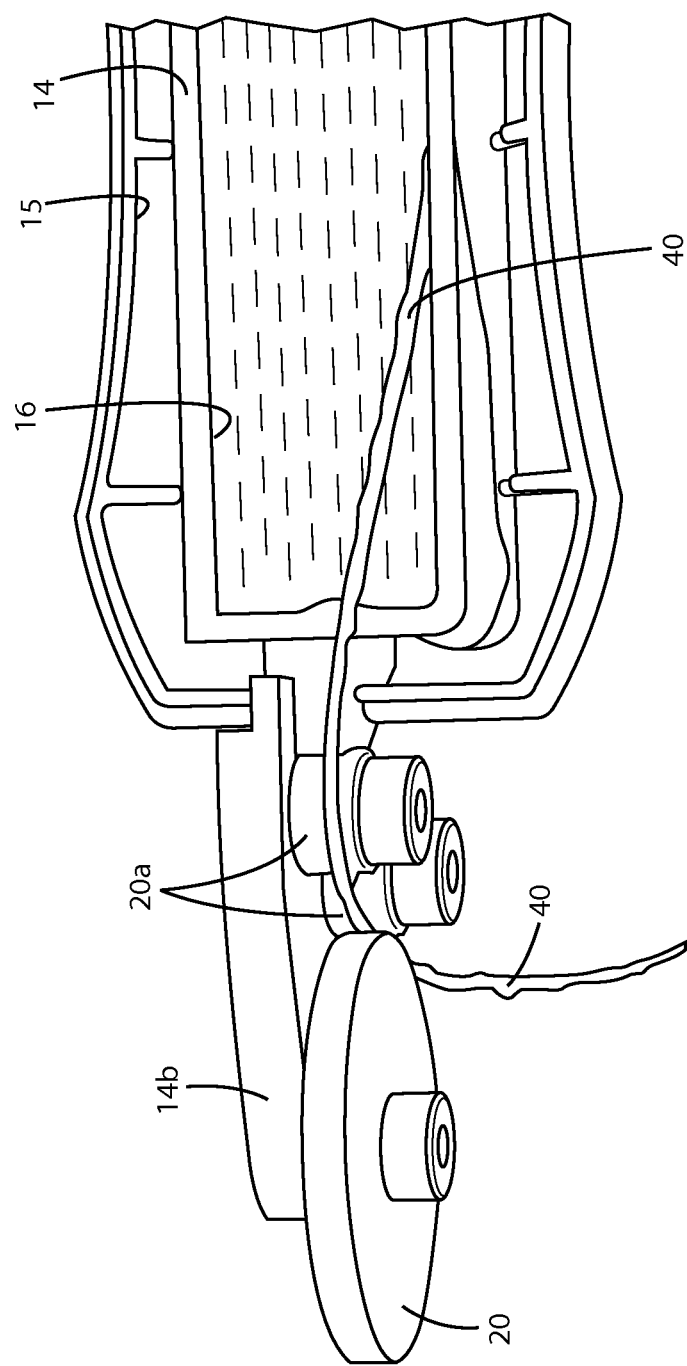
FIG. 6 is a top view of a portion of the tool body in FIG. 2, showing the cable in FIG. 5 exiting the activation chamber and engaging the applicator wheel on the tool body, according to the invention.

3. Mount the spool 18 on the mounting fingers 54 at the first end 14a of the tool chassis 14. Thread the fiber 40 to enter the activation chamber 16 in the tool chassis as shown in FIG. 5, and to exit the chamber 16 to be guided over rollers 20a and into a circumferential groove 21 formed on the main applicator wheel 20, as shown in FIG. 6. Place the tool chassis 14 with the mounted spool 18 and the threaded fiber 40 into the tool chassis cover 15 as shown in FIGS. 1, 5 and 6.

4. With the activated fiber 40 seated in the circumferential groove 21 in the wheel, route the fiber 40 with the tool 12 by rolling the main applicator wheel 20 in the direction toward the first end 14a of the tool chassis following the path 60 along exposed surfaces at the premises 64. The supply spool 18 will rotate on the mounting fingers 54 at the first end 14a of the tool chassis 14 as the fiber 40 unwinds from the first winding section of the spool, enters and exits the activation chamber 16, and is applied to the surface by the wheel 20 at the second end 14b of the tool chassis. If necessary, the tool 12 will route the fiber 40 over open flat areas of walls or ceilings, as well as inside corners or grooves.

5. Mount the ILU module 70 on a wall inside the premises 64, unmount the spool 18 with any remaining slack fiber from the first end 14a of the tool chassis 14, mount the spool with the slack fiber in the module 70, and plug the connector 50 at the end of the fiber 40 in the second winding section of the spool into a proximal end 80 of the module adapter 72.

FIG. 9 shows the interior of the storage module 70 including the optical connector adapter 72 inside the module. As mentioned, the proximal end 80 of the adapter 72 is configured to mate with the optical connector 50 at the end of the fiber 40 from the second winding portion of the spool 18, when the spool is placed in the module 70 as in FIG. 9. A distal end 82 of the adapter 72 is configured to mate with an optical connector 88 at one end of the jumper cable 74 that leads to the customer's ONT 68 inside the premises 64.

Inside the ILU module 70, the spool 18 mounts on three equi-circumferentially spaced resilient mounting fingers 84 that extend from a back wall 86 interiorly of the module 70. Catches 84a are formed near the ends of the fingers 84 to engage and seat in the annular groove 52 in the inside circumference of the spool 18, so that when the first end face 34 of the spool 18 is centered over the mounting fingers 84 and urged toward the back wall 86, the fingers 84 enter the bore in the spool hub and deflect toward one another until the catches 84a near the ends of the fingers seat in the groove 52 to define a mounted position for the spool 18.

When so mounted, the spool 18 is restrained from axial movement by the catches 84a which are urged by the mounting fingers 84 to stay seated in the annular groove 52 inside the spool. After mounting the spool 18 inside the opened ILU module 70 and making the connections at the proximal and the distal ends 80, 82 of the adapter 72, the module 70 is preferably closed using a cover that snaps or is otherwise easily fastened on the module.

Figure 11:
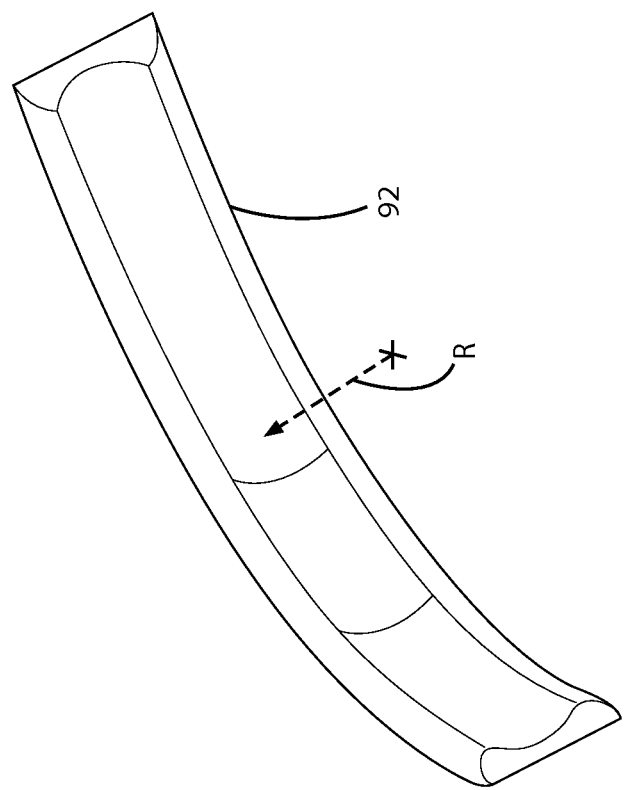
FIG. 11 is a view of an inside corner bend manager.
Figure 10:
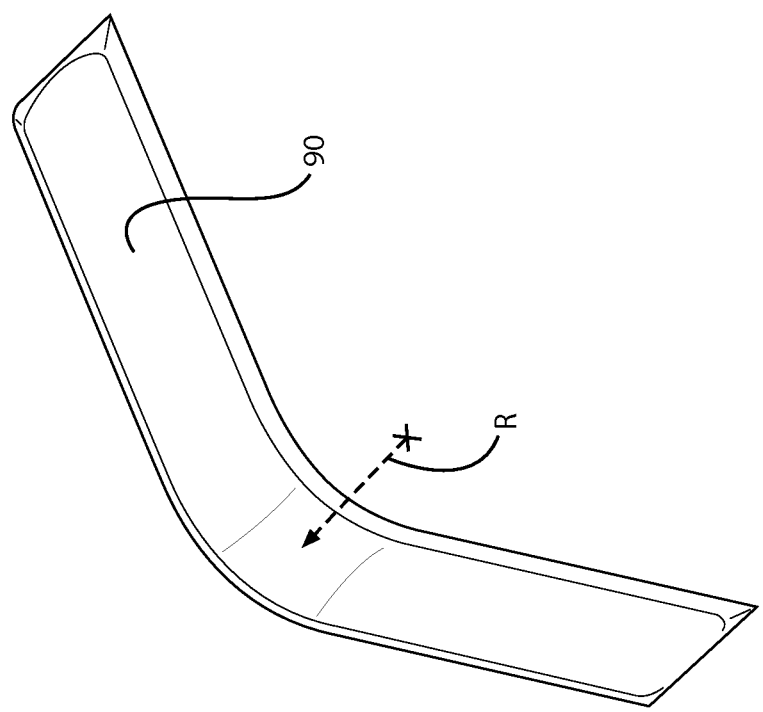
FIG. 10 is a view of an outside corner bend manager.

FIG. 10 shows an outside right-angle corner bend manager 90, and FIG. 11 shows an inside right angle corner bend manager 92, for use when routing the fiber 40 around right angle corners formed by walls, ceilings, and/or other exposed structural surfaces at the user premises 64 according to the invention. The bend managers 90, 92 preferably have a self-adhesive backing for adhering easily to the corner surfaces where they are placed, before the fiber 40 is routed over the bend managers at the corners. Both of the managers 90, 92 form a 90-degree bend with a radius of curvature R that exceeds the minimum specified for the fiber 40 in order to prevent appreciable signal transmission loss or fiber breakage at corners where the managers 90, 92 are deployed. For example, by setting R>=5 mm, the overall performance of the mentioned OFS EZ-Bend fiber and that of most other currently available bend insensitive fibers will not be compromised, even if the fiber 40 is routed over as many as 25 bend managers placed at various corners inside the premises 64.

Figures 12, 13:
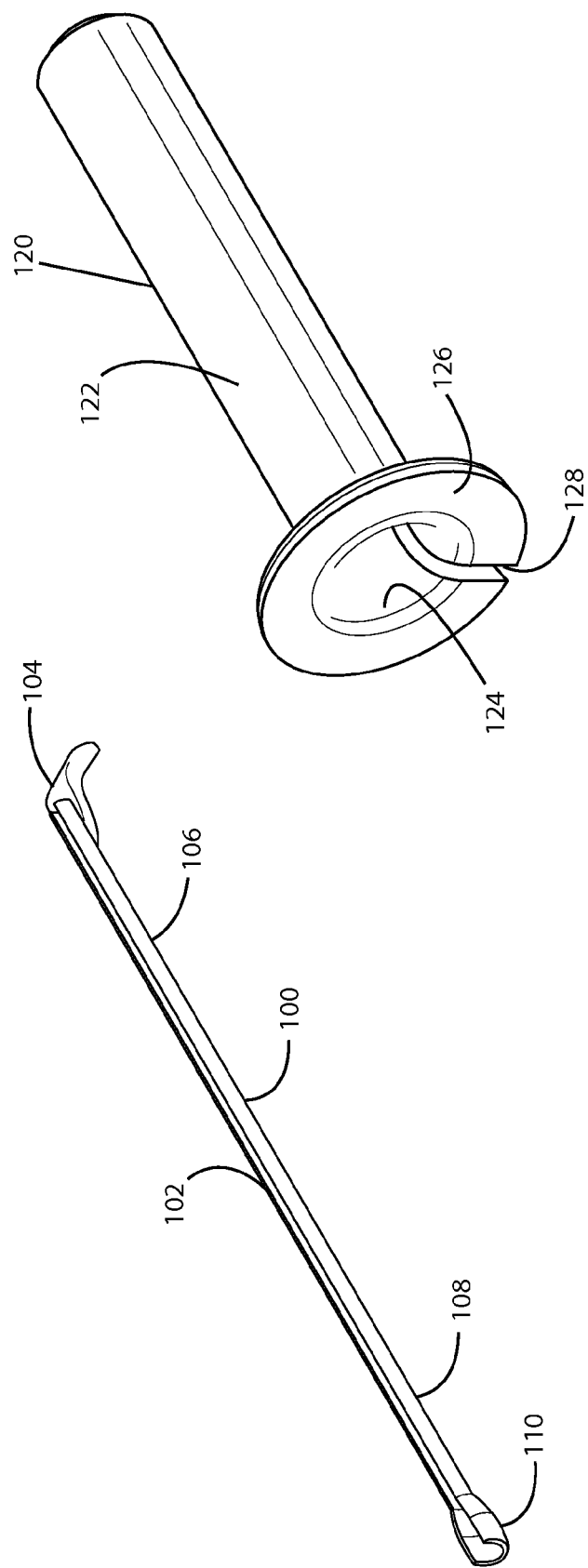
FIG. 12 shows a tool for passing a cable through a hole formed in a wall when routing the cable according to the invention.
FIG. 13 shows a sleeve for protecting the cable in FIG. 12 inside the wall hole.

FIGS. 12 to 16 show installation parts useful for routing the fiber 40 directly between adjoining rooms at the premises 64, according to the invention. In FIG. 12, a fiber insertion tool 100 is in the form of an elongated sleeve of a length of about 11 inches and with an axial slit 102. A thumb/finger handle tip 104 is provided at a proximal end 106 of the sleeve 100, and a leading or distal end 108 of the sleeve has a short, radially outward flare 110.

Figure 15:
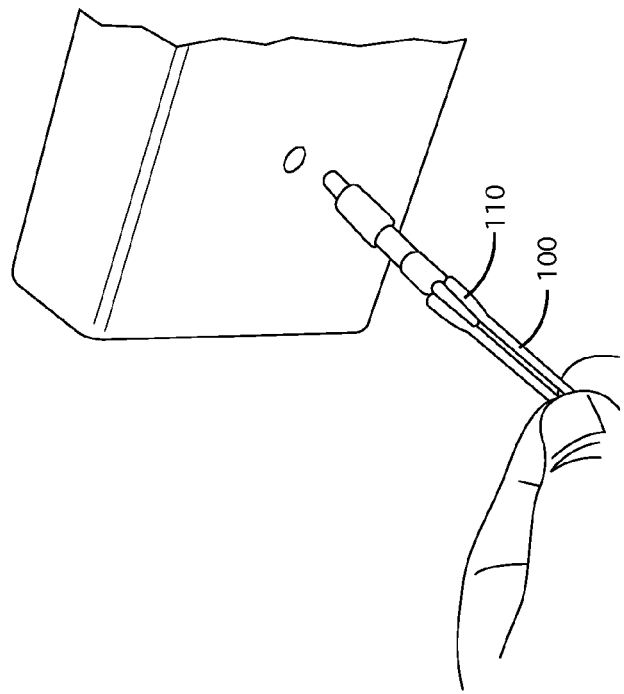
FIG. 15 illustrates the tool of FIG. 12 in use.

After drilling a, e.g., 5/16 inch diameter opening through a wall that separates the rooms, a leading end length of the fiber 40 is urged through the slit 102 to align with the sleeve axis, with a leading end of the fiber extending forward from the flare 110. If the leading end has an existing connector, the connector housing is removed so that only a ferrule part 112 of the connector is present at the leading end as seen in FIG. 15.

The insertion tool 100 is advanced through one end of the wall opening while the ferrule part 112 (if present) at the leading end of the fiber 40 nests in the flare 110. When the leading end of the fiber emerges from the wall opening in the adjoining room, the proximal end 106 of the sleeve 100 is withdrawn while the fiber 40 is allowed to exit the sleeve through the axial slit 102 in the tool wall. A sufficient length of the fiber can then be passed through the wall opening for routing in the adjoining room.

FIG. 13 shows a hole plug 120 for insertion in a wall opening after the fiber 40 is passed through the opening as detailed above. The plug has a cylindrical body 122 with an axial bore 124, and the outside diameter of the body 122 is such as to obtain a tight fit when the plug body 122 is inserted in the wall opening. The plug 120 also has a radially outwardly flared end cap 126 at a proximal end of the plug, and an axial slit 128 over the entire length of the plug including the end cap 126. The distal end of the plug 120 can then be inserted in the wall opening so that, as the end cap 126 is urged toward the wall surface, the fiber 40 enters the slit 128 or the bore 124 in the plug body 122.

Figure 16:
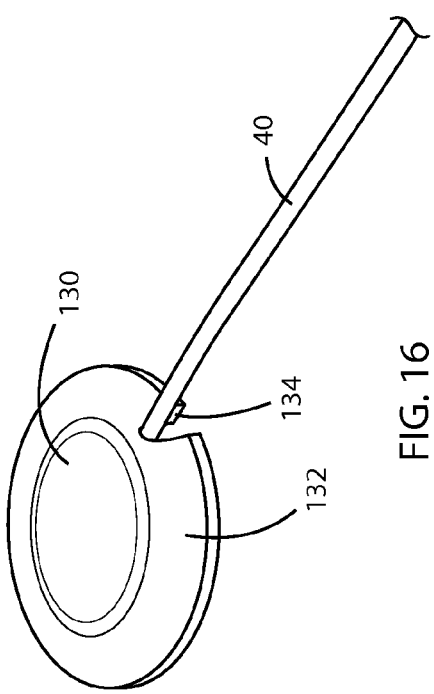
FIG. 16 shows a cover for the cap of FIG. 14, and a cable exiting the cover after being routed about the cap and through the wall sleeve of FIG. 13.
Figure 14:
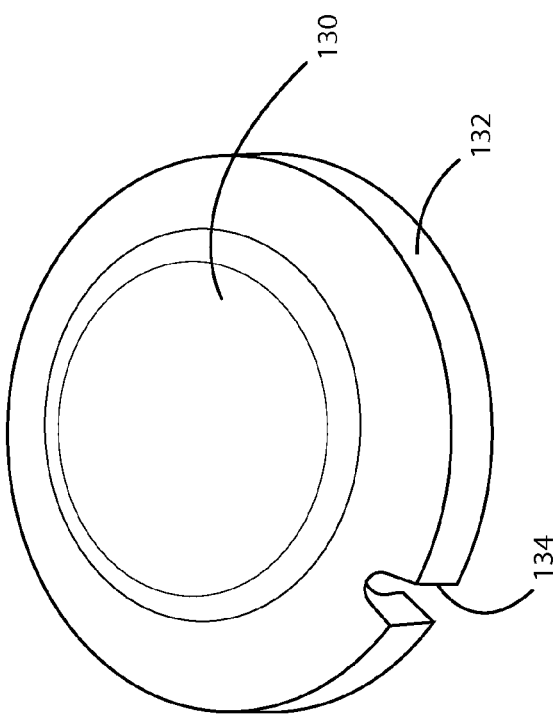
FIG. 14 shows a cap for covering the sleeve in FIG. 13 on the outside surface of the wall.

FIG. 14 shows a plug cap 130 for covering the exposed end cap 126 of the hole plug 120, after the plug is inserted in the wall opening. The plug cap 130 has a cylindrical rim 132 dimensioned and formed to snap in place about the circumference of the end cap 126 of the hole plug 120 in FIG. 13. A notch 134 is cut to a sufficient depth in the circumference of the rim 132 so that the fiber 40 can clearly pass through the notch 134 and bend safely to conform with the surrounding wall surface, as shown in FIG. 16.

As disclosed herein, the inventive fiber/cable routing method and system offer the following desirable features:

A. Low Visibility—An installation of a 900 micron optical fiber such as EZ-Bend will cover up to ten times less surface area than typical installations using 2.9 mm diameter cordage, and up to 20 times less area than taped fiber routing systems. The elimination of unsightly staples also reduces the risk of damaging the fiber and adjacent walls or moldings.

B. The fiber 40 can be installed twice as fast as in tape based systems.

C. No connector terminations or fiber splices need to be carried out during installation in the field.

D. Auto slack fiber management by use of the ILU module 70.

E. Fast and convenient fiber placement using the hand tool 12.

F. Easy to use, self-adhering corner bend managers 90, 92.

G. The installed fiber 40 gains physical protection by adjacent surfaces.

H. A single installation kit to satisfy most residential applications need only include:
  (a) the tool 12 with the adhesive activation chamber 16 pre-filled with an ample supply of the activating substance,
  (b) the spool 18 containing up to 150 feet of coated fiber 40,
  (c) up to 25 bend managers 90, 92, and
  (d) the through-the-wall fiber routing hardware of FIGS. 12-14.

I. The system is environmentally friendly, i.e., free of heavy metals, RoHS-compliant, not hazardous to human touch, and leaves little waste.

While the foregoing represents preferred embodiments of the invention, it will be understood by those skilled in the art that various modifications, additions, and changes may be made without departing from the spirit and scope of the invention, and that the invention includes all such modifications, additions, and changes as are within the scope of the following claims.

We claim:

1. An optical fiber or cable storage module for installation at a customer premises, comprising:
   a back wall, and a number of resilient mounting fingers extending from the back wall inside the module, and a fiber optic connector adapter supported inside the module;
   a supply spool having a hub with a first axial end face, a second axial end face, and an axial bore with an inner circumference dimensioned and formed to (a) receive the mounting fingers when the bore in the hub is centered over the fingers, and (b) engage the mounting fingers when the spool is urged toward a mounted position adjacent the back wall of the module so that the spool is restrained from axial movement away from the mounted position, and the spool includes:
   a first winding section for containing a first length of a given fiber or cable for routing the fiber or cable between a service terminal located outside a customer premises where an end of the fiber or cable is connected to the service terminal, and a location inside the premises where the module is mounted, and
   a second winding section for containing a second length of the given fiber or cable for connecting the opposite end of the fiber or cable to a proximal end of the connector adapter when the supply spool is placed at the mounted position inside the module;
   a first set of circumferentially spaced retaining flanges extending radially outward from the first axial end face of the spool hub, a second set of circumferentially spaced retaining flanges extending radially outward from the second axial end face of the hub opposite the first set of flanges, and the first and the second sets of retaining flanges define the first winding section of the supply spool;
   a third set of circumferentially spaced retaining flanges extending radially outward with respect to the spool hub and at a certain axial offset from the second set of retaining flanges, and the second and the third sets of retaining flanges define the second winding section of the supply spool; and
   wherein the mounting fingers have corresponding catches, and the inner circumference of the axial bore in the hub of the supply spool has an annular groove dimensioned and formed to seat the catches for restraining the spool from said axial movement away from the mounted position.

2. An optical fiber or cable storage module according to claim 1, wherein the supply spool contains the given fiber or cable having an overall length in the range of from about 25 feet (7.62 m) to about 150 feet (45.72 m).

3. An optical fiber or cable storage module according to claim 2, wherein the the second length of the fiber or cable contained in the second winding section of the supply spool is terminated with a connector configured to connect to the proximal end of the connector adapter inside the module when the spool is at the mounted position.

4. An optical fiber or cable storage module according to claim 1, wherein the mounting fingers extend from the back wall of the module in a circular array in which the fingers are spaced equally from one another.

5. An optical fiber or cable storage module according to claim 1, including three of the mounting fingers.

6. An optical fiber or cable storage module according to claim 1, wherein the given fiber or cable contained on the supply spool is coated with a substance for adhering the fiber or cable to a surface over which the fiber or cable is routed when the substance is activated.

7. An optical fiber or cable storage module according to claim 1, wherein the fiber or cable contained on the supply spool comprises an EZ-Bend® or equivalent bend-insensitive fiber.

8. An optical fiber or cable storage module according to claim 1, wherein the supply spool is dimensioned and arranged for mounting on a tool that routes the first length of the fiber or cable in the first winding section of the spool between the service terminal outside the customer premises and the location inside the premises where the module is mounted, before the supply spool is mounted in the module for storage.

* * * * *